(12) United States Patent
Mishima et al.

(10) Patent No.: US 12,191,753 B2
(45) Date of Patent: Jan. 7, 2025

(54) DC-DC CONVERTER AND SEMICONDUCTOR IC FOR CABLE VOLTAGE DROP COMPENSATION

(71) Applicants: Takehito Mishima, Atsugi (JP); Akira Sato, Atsugi (JP); Tomomitsu Ohara, Yamato (JP)

(72) Inventors: Takehito Mishima, Atsugi (JP); Akira Sato, Atsugi (JP); Tomomitsu Ohara, Yamato (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 258 days.

(21) Appl. No.: 17/998,937

(22) PCT Filed: Apr. 23, 2021

(86) PCT No.: PCT/JP2021/016403
§ 371 (c)(1),
(2) Date: Nov. 16, 2022

(87) PCT Pub. No.: WO2021/235171
PCT Pub. Date: Nov. 25, 2021

(65) Prior Publication Data
US 2023/0179077 A1 Jun. 8, 2023

(30) Foreign Application Priority Data
May 19, 2020 (JP) ................. 2020-087560

(51) Int. Cl.
*H02M 3/158* (2006.01)
*H02M 1/00* (2006.01)
*H02M 1/08* (2006.01)

(52) U.S. Cl.
CPC ....... *H02M 1/0012* (2021.05); *H02M 1/0025* (2021.05); *H02M 1/08* (2013.01)

(58) Field of Classification Search
CPC ............. H02M 1/0025; H02M 1/0012; H02M 1/0019; H02M 3/158; H02M 3/156
See application file for complete search history.

(56) References Cited

U.S. PATENT DOCUMENTS

| | | | | |
|---|---|---|---|---|
| 2011/0101937 A1* | 5/2011 | Dobkin | ................. | H02M 3/156 323/282 |
| 2012/0081096 A1* | 4/2012 | Fujii | ..................... | H02M 3/156 323/285 |

(Continued)

FOREIGN PATENT DOCUMENTS

| | | | |
|---|---|---|---|
| CN | 203445784 U | * | 2/2014 |
| JP | 2000-171270 A | | 6/2000 |

(Continued)

OTHER PUBLICATIONS

International Search Report of PCT/JP2021/016403 dated Jul. 6, 2021.

(Continued)

*Primary Examiner* — Adolf D Berhane
*Assistant Examiner* — Jye-June Lee
(74) *Attorney, Agent, or Firm* — Shih IP Law Group, PLLC.

(57) ABSTRACT

A DC-DC converter that converts a DC input voltage supplied from a DC power supply and that outputs a DC voltage with a different potential is shown. The DC-DC converter includes the following. A control circuit controls a switching element in accordance with a potential difference between a feedback voltage proportional to an output voltage and a predetermined reference voltage. A current supply circuit that causes a predetermined current to flow. A voltage correction circuit that corrects the reference voltage or the feedback voltage. The voltage correction circuit is configured to determine a voltage correction amount, based on information about a resistance on a load side input from (Continued)

outside when a current of the current supply circuit is output, and correct the reference voltage or the feedback voltage.

14 Claims, 6 Drawing Sheets

(56) References Cited

U.S. PATENT DOCUMENTS

| | | | |
|---|---|---|---|
| 2014/0016374 A1* | 1/2014 | Yang | H02M 3/33523 |
| | | | 363/21.15 |
| 2015/0333514 A1* | 11/2015 | Wang | H02M 3/156 |
| | | | 307/103 |

FOREIGN PATENT DOCUMENTS

| | | |
|---|---|---|
| JP | 2012080698 A | 4/2012 |
| JP | 2012-139023 A | 7/2012 |
| JP | 2013-085382 A | 5/2013 |

OTHER PUBLICATIONS

International Preliminary Report on Patentability dated Nov. 17, 2022.

* cited by examiner

DC-DC CONVERTER AND SEMICONDUCTOR IC FOR CABLE VOLTAGE DROP COMPENSATION

TECHNICAL FIELD

The present invention relates to a power supply device that converts a DC voltage and, for example, to a technology effective in use for a DC-DC converter and a semiconductor integrated circuit that controls a power supply that have a function of compensating a voltage drop in a cable for supplying a power supply to a load.

BACKGROUND ART

Circuits that convert an input DC voltage into a DC voltage to be output with a different potential include switching regulator scheme DC-DC converters. Such DC-DC converters include a DC-DC converter that includes: a switching element that applies, to an inductor (coil), a DC voltage supplied from a DC power supply, causes a current to flow, and causes energy to be accumulated in an inductor; a rectifier element that rectifies the current of the inductor in an energy discharge time period during which the switching element is off; and a control circuit that performs on/off control of the switching element. In the switching regulator scheme DC-DC converter, the magnitude of an output voltage is detected by an error amplifier, and control is performed so that as the output voltage decreases, the on time of the switching element is increased, and as the output voltage increases, the on time becomes shorter.

There is a system that supplies a power supply from a power supply device, such as a DC-DC converter, to a device serving as a load, through a cable. According to such a system, with increase in the length of the cable for supplying the power supply, a flow of current from the power supply device to the load through the cable causes a voltage drop owing to the resistance that the cable has, and thus the power supply voltage required by the load unit cannot be secured. Accordingly, the output voltage is required to be corrected on the power supply side. Note that the power supply device includes: a semiconductor integrated circuit (hereinafter called a power supply IC) that internally includes a switch element for causing a current to flow through a passive element, such as an inductor, and a circuit that generates a signal for on/off control of the switch element at appropriate timing; and elements, such as a capacitor and a resistor connected to the power supply IC.

Figure 7:
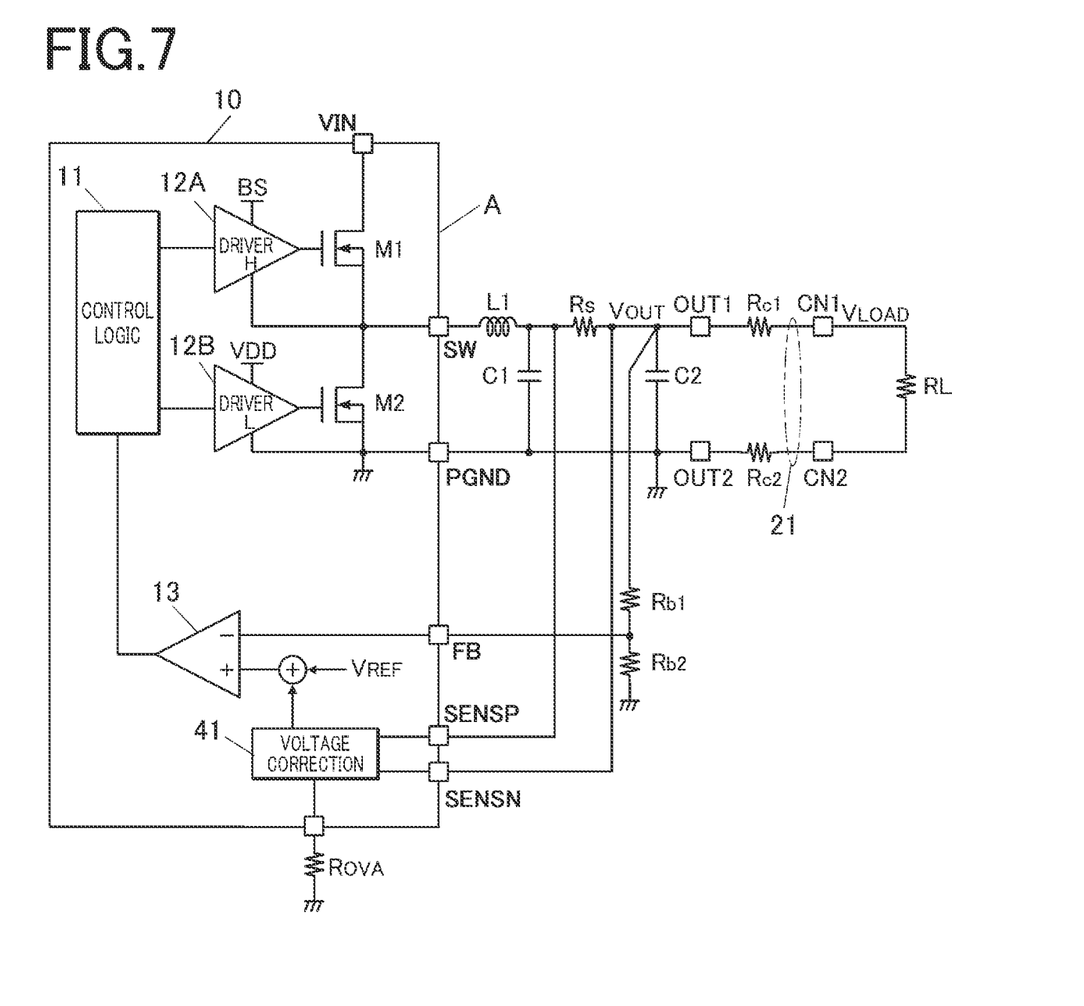
FIG. 7 is a circuit configuration diagram showing a configuration example of the conventional DC-DC converter and the power supply IC.

Conventionally, correction of the output voltage of the DC-DC converter assumes a voltage drop due to a power supply cable and preliminarily configures a setting of a high output voltage, or provides the power supply IC side with a circuit that corrects the voltage, detects the resistance value of the cable when the cable is connected and corrects the voltage. Specifically, as shown in FIG. 7, a resistor Rs for current detection is provided at the middle of wiring connected to a power supply cable 21, and a voltage correction circuit 41 is provided that corrects a reference voltage VREF, which is to be input into an error amplifier 13 in the power supply IC and be compared with the output feedback voltage VFB, in accordance with the voltage detected by the resistor Rs for current detection. Note that in FIG. 7, RL is an equivalent resistance of a device serving as a load, Rc1 and Rc2 are resistance components of the cable 21, and ROVA is an external resistor for adjusting the correction voltage.

CITATION LIST

Patent Literature

Patent Document 1: JP 2013-85382A
Patent Document 2: JP 2000-171270A

SUMMARY OF INVENTION

Technical Problem

The DC-DC converter using the conventional power supply IC shown in FIG. 7 can keep the voltage applied to the power supply terminal of the load unit constant irrespective of the magnitude of the output current. However, in the case of such a configuration, the voltage correction amount determined based on the resistance value of the dividing resistor Rb1 and Rb2 of the output and on the resistance value of the resistor ROVA for adjustment are required to be preset. Accordingly, design is made considering in advance the information (the resistance value on the load side) between OUT1-OUT2 terminals on the power supply IC side, thus causing a problem of increase in design man-hour. A system designer is required to determine the value of the external resistor for adjustment, and the external resistor is required, thus causing a problem of increase in the number of components constituting the system.

Inventions which provide an output voltage correction circuit in order to supply an accurate voltage to a load unit include, for example, what is described in Patent Document 1.

However, the invention described in Patent Document 1 has an object to keep the output voltage constant while reducing the ripple depending on the values of the input voltage, the inductor current, the switching frequency, the inductor value, and the equivalent series parasitic resistance of the output capacitor, thus has the object different from that of the present invention, and is different from the present invention in correcting the reference voltage of the error amplifier based on the output feedback voltage, and not correcting the voltage in accordance with the magnitude of the output current.

Inventions pertaining to a power supply circuit that have an object of allowing a system supplying a load unit with a power supply through a cable to negate the need to adjust the output voltage in accordance with a voltage drop due to the length of wiring of the cable every time the drop occurs include, for example, what is described in Patent Document 2. However, the invention described in Patent Document 2 provides a power supply voltage level detection circuit for an encoder serving as a load unit, and transmits information on the detected voltage to a power supply circuit, thus having a problem that the burden on a system designer is heavy.

Furthermore, the inventions described in Patent Documents 1 and 2 are each required to detect the output voltage or the voltage on the load side continuously while the system is in operation.

The prevent invention has been made in view of the background as described above, and has an object to provide a DC-DC converter and a semiconductor integrated circuit that controls a power supply, and a power supply device that can negate the need to make a design considering in advance the resistance value on the load side, and reduce the burden on the system designer.

Furthermore, the present invention has another object to provide a DC-DC converter and a semiconductor integrated circuit that controls a power supply, and a power supply device that can keep the voltage applied to a power supply terminal of a load unit constant without detecting the output voltage or the voltage on the load side continuously while the system is in operation.

Solution to Problem

To achieve the object described above, the present invention is
- a DC-DC converter that converts a DC input voltage supplied from a DC power supply and that outputs a DC voltage with a different potential, the DC-DC converter comprising:
- a control circuit that controls a switching element in accordance with a potential difference between a feedback voltage proportional to an output voltage and a predetermined reference voltage;
- a current supply circuit that causes a predetermined current to flow; and
- a voltage correction circuit that corrects the reference voltage or the feedback voltage,
- wherein the voltage correction circuit is configured to determine a voltage correction amount, based on information about a resistance on a load side input from outside when a current of the current supply circuit is output, and correct the reference voltage or the feedback voltage.

According to the configuration as described above, the DC-DC converter has the function of automatically correcting the reference voltage, which is to be compared with the feedback voltage. Accordingly, there is no need to make the design considering in advance the resistance value on the load side. With this, the burden on the system designer can be decreased.

The voltage applied to the power supply terminal of the load unit can be kept constant without detecting the output voltage or the voltage on the load side continuously while the system is in operation.

Note that the information about the resistance on the load side includes the resistance value of a cable or wiring for power supply to a load unit or a load device. The information about the resistance on the load side allows transmission from the load unit or the load device to the DC-DC converter using a communication unit of a standard, such as of RS485, for example.

Here, preferably, the DC-DC converter further includes a path switch that outputs a current of the current supply circuit toward a voltage output terminal in accordance with a signal supplied from the outside to control execution/stop of a circuit operation changing to a significant level.

According to such a configuration, a signal from the outside enables the current of the current supply circuit to be output toward the voltage output terminal.

Preferably, a current-voltage conversion element is connected between a voltage input terminal and a voltage output terminal in series with the switching element, and
the current of the current supply circuit is output toward the voltage output terminal through the current-voltage conversion element, and the voltage correction circuit is configured to determine a voltage correction amount, based on a voltage converted by the current-voltage conversion element, and correct the reference voltage or the feedback voltage.

According to such a configuration, based on the voltage converted by the current-voltage conversion element (resistor for current detection), the voltage correction amount is determined and the reference voltage or the feedback voltage is corrected. Thus, resistance value information on the load side is not required to be transmitted from the load unit side. Accordingly, the burden on the system designer can be reduced.

Furthermore, preferably, the voltage correction circuit includes:
- a subtraction circuit that calculates a potential difference between both terminals of the current-voltage conversion element;
- a first voltage-current conversion circuit that converts the potential difference calculated by the subtraction circuit into a current;
- a variable resistor circuit connected to the first voltage-current conversion circuit;
- a second voltage-current conversion circuit that converts the reference voltage into a current; and
- a combining circuit that combines the current converted by the first voltage-current conversion circuit, with the current converted by the second voltage-current conversion circuit, and converts the combined current into a voltage and outputs the voltage as a corrected voltage,
- wherein the variable resistor circuit is configured so that the larger the potential difference is, the higher the resistance value is, in accordance with the voltage converted by the current-voltage conversion element.

According to such a configuration, the variable resistor circuit that automatically determines the voltage correction amount is provided. Accordingly, the system designer is not required to determine the value of the external resistor for adjustment. Consequently, the burden on the system designer can be reduced. Moreover, the variable resistor circuit is included in an IC for power supply control, which can reduce the number of components constituting the DC-DC converter.

Preferably, the control circuit includes:
- an error amplifier circuit that outputs a voltage in accordance with a potential difference between a voltage divided by a voltage divider circuit connected between a voltage output terminal and a ground point, and the reference voltage; and
- a logic circuit that generates an on/off control signal of the switching element in accordance with the output voltage of the error amplifier circuit.

Accordingly, the DC-DC converter can be easily designed using conventional design assets.

Another invention of the present application is semiconductor integrated circuit that controls a power supply constituting a DC-DC converter that converts a DC input voltage supplied from a DC power supply and outputs a DC voltage with a different potential, by turning on and off a switching element connected between a voltage input terminal and an external terminal to which one terminal of an inductor is connected, and rectifying a current flowing through the inductor, the semiconductor integrated circuit comprising:
- a control circuit that controls the switching element in accordance with a potential difference between a feedback voltage proportional to the output voltage and a predetermined reference voltage;
- a current supply circuit that causes a predetermined current to flow;
- a path switch that outputs the current of the current supply circuit toward a voltage output terminal;
- a voltage correction circuit that corrects the reference voltage or the feedback voltage; and an external information input terminal through which an information signal from outside is input, wherein the voltage correction circuit is configured to determine a voltage correction amount, based on the information signal input through the external information input terminal from a load side when the current of the current supply circuit is output, and correct the reference voltage or the feedback voltage.

According to the configuration as described above, the IC for power supply control has the function of automatically correcting the reference voltage, based on the information from the outside, the reference voltage being compared with the feedback voltage. Accordingly, there is no need to design the DC-DC converter considering in advance the resistance value information on the load side, which can reduce the burden on the system designer. The voltage applied to the power supply terminal of the load unit can be kept constant without detecting the output voltage or the voltage on the load side continuously while the system is in operation. Furthermore, based on the voltage converted by the current-voltage conversion element (resistor for current detection), the voltage correction amount is determined and the reference voltage or the feedback voltage is corrected. Thus, resistance value information on the load side is not required to be transmitted from the load unit side. Accordingly, the burden on the system designer can be reduced.

Here, preferably, the circuit further includes:
an input terminal of a signal to control execution/stop of a circuit operation supplied from the outside; and
a pair of external information input terminals through which voltages of both terminals of a current-voltage conversion element connected to another terminal of the inductor in series with the inductor are input,
wherein the path switch outputs the current of the current supply circuit to a terminal connected to a connection point between the inductor and the current-voltage conversion element between the pair of the external information input terminals, in accordance with the signal changing to a significant level, and
wherein the voltage correction circuit is configured to determine a voltage correction amount, based on a difference of the voltages input through the pair of the external information input terminals when the current of the current supply circuit is output, and correct the reference voltage or the feedback voltage.

According to such a configuration, the current of the current supply circuit can be allowed to flow to the current-voltage conversion element using the terminal for receiving the voltage converted by the current-voltage conversion element (resistor for current detection). Accordingly, the number of external terminals of the IC can be reduced.

Furthermore, preferably, the voltage correction circuit includes:
a subtraction circuit that calculates a potential difference between both terminals of the current-voltage conversion element;
a first voltage-current conversion circuit that converts the potential difference calculated by the subtraction circuit into a current;
a variable resistor circuit connected to the first voltage-current conversion circuit;
a second voltage-current conversion circuit that converts the reference voltage into a current; and
a combining circuit that combines the current converted by the first voltage-current conversion circuit, with the current converted by the second voltage-current conversion circuit, and converts the combined current into a voltage and outputs the voltage as a corrected voltage,
wherein the variable resistor circuit is configured so that the larger the potential difference is, the higher the resistance value is, in accordance with the voltage converted by the current-voltage conversion element.

According to such a configuration, the variable resistor circuit that automatically determines the voltage correction amount is provided. Accordingly, the system designer is not required to determine the value of the external resistor for adjustment. Consequently, the burden on the system designer can be reduced, while the variable resistor circuit is included in an IC for power supply control, which can reduce the number of components constituting the DC-DC converter.

Preferably, the control circuit includes:
an error amplifier circuit that outputs a voltage in accordance with a potential difference between a voltage divided by a voltage divider circuit connected between the voltage output terminal and a ground point, and the reference voltage; and
a logic circuit that generates an on/off control signal of the switching element in accordance with the output voltage of the error amplifier circuit.

Accordingly, the DC-DC converter can be easily designed using conventional design assets.

Advantageous Effects of Invention

According to the present invention, the function of automatically correcting the reference voltage, which is to be compared with the feedback voltage, is provided. Accordingly, the DC-DC converter and the semiconductor integrated circuit that controls the power supply can be provided so as to be able to negate the need of design considering in advance the resistance value on the load side, and reduce the burden on the system designer. Furthermore, there is an advantageous effect that can provide a DC-DC converter and a semiconductor integrated circuit that controls a power supply, and a power supply device that can keep constant the voltage applied to a power supply terminal of a load unit without detecting the output voltage or the voltage on the load side continuously while the system is in operation.

DESCRIPTION OF EMBODIMENTS

Hereinafter, preferred embodiments of the present invention are described with reference to the drawings.

Figure 1:
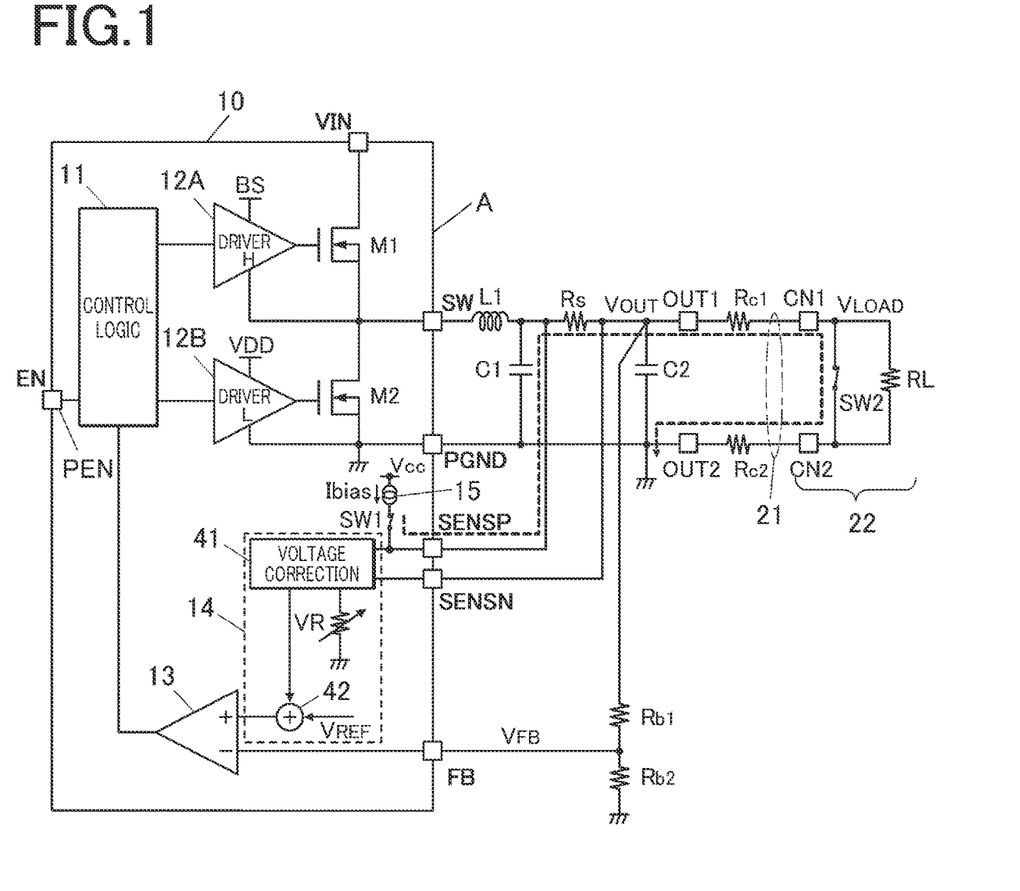
FIG. 1 is a circuit configuration diagram showing one embodiment of a DC-DC converter and a semiconductor integrated circuit for a power supply (power supply IC) to which the present invention is applied.

FIG. 1 shows one embodiment in a case of application of the present invention to a switching control scheme DC-DC converter (DC power supply device). Note that although not specifically limited, elements constituting a circuit surrounded by a solid line A in FIG. 1 are formed on a single semiconductor chip and are configured as a semiconductor integrated circuit (IC). A circuit on the left side of output terminals OUT1 and OUT2 is formed on a substrate that is formed of a printed circuit board, for example. The output terminals OUT1 and OUT2, and the IC and the components and elements on the substrate are connected by printed wiring formed on the substrate.

The DC-DC converter in this embodiment includes: a semiconductor integrated circuit that controls a power supply (hereinafter called a power supply IC) 10 that internally includes a switch element for causing a current to flow to the outside, and a control circuit for generating a signal for performing on/off control of the switch element at appropriate timing; an inductor (coil) L1 whose one terminal is connected to an external terminal SW of the power supply IC 10; a smoothing capacitor C1 connected between the other terminal of the inductor L1 and a ground point (a ground terminal PGND of the IC); a resistor Rs for current detection connected in series to the inductor L1 between the external terminal SW and a voltage output terminal OUT1; and a smoothing capacitor C2 connected between the voltage output terminal OUT1 and the ground point.

The DC-DC converter in this embodiment includes a voltage output terminal OUT2 connected to the same ground point as the ground terminal PGND of the power supply IC 10. One end of the cable 21 is connected to the voltage output terminals OUT1 and OUT2, and the other end is connected to voltage input terminals CN1 and CN2 of the unit 22 serving as a load. A DC voltage is supplied to a load via the cable 21. The resistors Rc1 and Rc2 represent the resistance component that the cable 21 has. RL represents the equivalent resistance (load resistance) of the load unit 22. In-series resistors Rb1 and Rb2 connected between the voltage output terminal OUT1 and the ground point are bleeder resistors that input a voltage VFB obtained by dividing the output voltage Vout of the DC-DC converter, into a feedback terminal FB of the power supply IC 10.

The power supply IC 10 includes: a switching transistor M1 that serves as a switching element and is made up of an N-channel type MOSFET (field-effect transistor) that is connected between a voltage input terminal VIN to which a DC voltage supplied from the DC power supply, such as a battery, is applied and the external terminal SW, and causes a current to flow to the inductor L1 to drive this inductor; a synchronous rectification transistor M2 connected between the external terminal SW and the ground terminal PGND; a logic circuit 11 serving as a control circuit that generates a signal for performing on/off control of the transistors M1 and M2 described above; driver circuits 12A and 12B that perform on/off control of the transistors M1 and M2 described above in accordance with the on/off control signal generated by the logic circuit 11; an error amplifier 13 whose inverting input terminal is connected to the feedback terminal FB; and a reference voltage supply circuit 14 that supplies a reference voltage VREF' to be applied to a non-inverting input terminal of the error amplifier 13. The power supply voltage of the driver circuit 12A is a voltage BS obtained by boosting an internal voltage VDD of the IC.

The power supply IC 10 includes: external terminals SENSP and SENSN that receive voltages at both the terminals of the resistor Rs for current detection described above; a constant current supply 15 and the switch element SW1 connected in series to an internal power supply voltage terminal Vcc and the external terminal SENSP; and an external terminal PEN for receiving an enable signal EN for bringing the power supply IC 10 into an operation state from the outside. The enable signal EN is input into the logic circuit 11. The logic circuit 11 generates a control signal CS for temporarily turning on the switch element SW1 when the enable signal EN rises to a high level that is a significant level. A switch element SW2 for shunting the CN1 and CN2 by the enable signal EN is provided also between the voltage input terminals CN1 and CN2 of the load unit 22.

Figure 2:
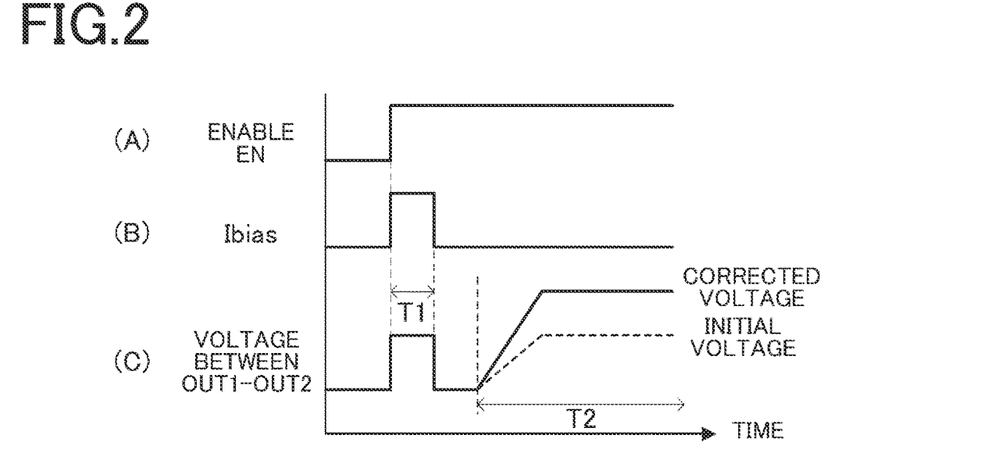
FIG. 2 is a timing chart showing variation in an enable signal, a current caused to flow to a resistor for current detection, and a supply voltage to a load unit in the DC-DC converter in FIG. 1.

Accordingly, when the switch elements SW1 and SW2 are turned on, a current Ibias is temporarily caused to flow from the constant current supply 15 to the resistor Rs for current detection through the external terminal SENSP, as shown in FIG. 2(B).

By the current Ibias output from the external terminal SENSP, the voltage between the output terminals OUT1-OUT2 changes, and voltages caused by a voltage drop at the resistor Rs for current detection enter the external terminals SENSP and SENSN, as indicated by a time period T1 in FIG. 2(C). At this time, the voltages caused by the voltage drop at the resistor Rs for current detection depend on the resistance component of the cable 21 and the equivalent resistance RL of the load unit 22. Thus, the voltage on the load side is reflected.

The reference voltage supply circuit 14 includes: a voltage correction circuit 41 that generates a correction voltage VOVA for correcting the reference voltage to be applied to the non-inverting input terminal of the error amplifier 13, based on the input voltages of the external terminals SENSP and SENSN described above; a combiner 42 that combines the voltage VOVA generated by the voltage correction circuit 41 with the reference voltage VREF serving as the reference, and supplies the corrected reference voltage to the error amplifier 13; and a variable resistor circuit VR for adjusting the voltage correction amount by the voltage correction circuit 41. Accordingly, as indicated by a time period T2 in FIG. 2(C), what changes as indicated by a broken line in a case without voltage correction changes as indicated by a solid line by voltage correction. The voltage correction amount by the voltage correction circuit 41 has the magnitude depending on the resistance value of the load resistance RL.

Figure 3:
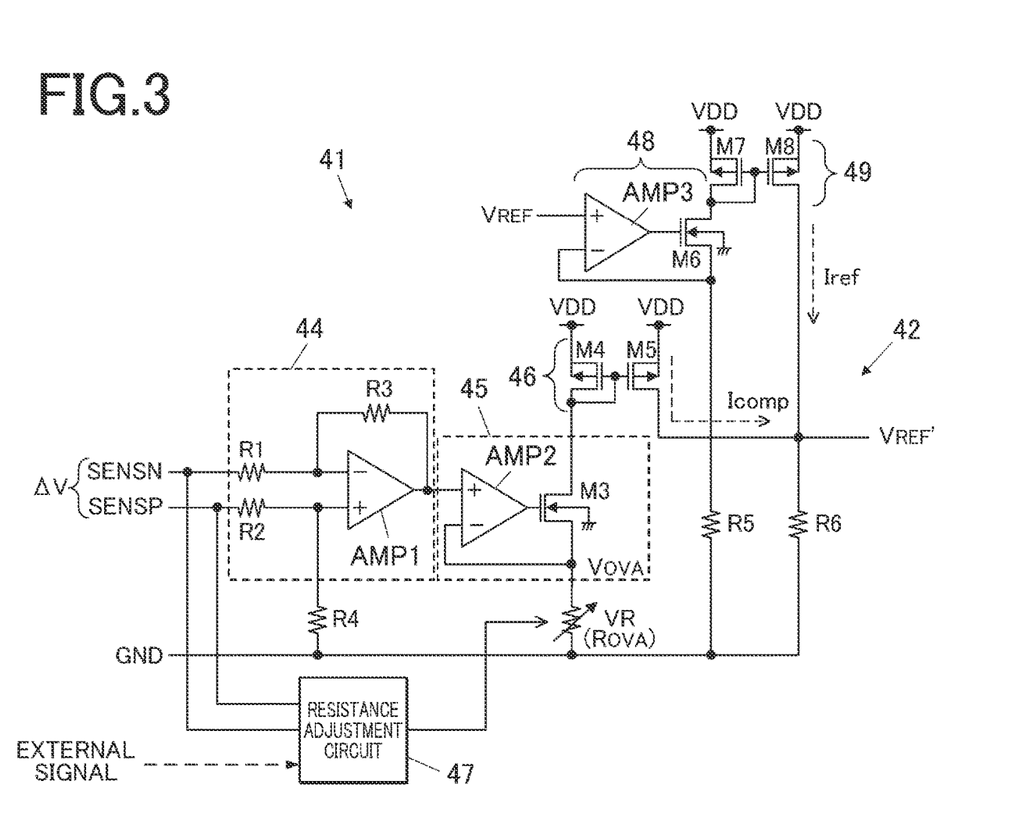
FIG. 3 is a circuit configuration diagram showing a specific example of a voltage correction circuit in the power supply IC.

FIG. 3 shows a specific circuit configuration example of the voltage correction circuit 41 described above.

As shown in FIG. 3, the voltage correction circuit 41 in this embodiment includes: a subtraction circuit 44 that includes input resistors R1 and R2, an operational amplifier AMP1 and a feedback resistor R3; a voltage-current conversion circuit 45 that includes a buffer amplifier AMP2 having a non-inverting input terminal into which the output of the subtraction circuit 44 is input, and a MOS transistor M3 having a gate terminal to which the output of the amplifier AMP2 is applied; and a current mirror circuit (M4 and M5) 46 that causes a current proportional to the current flowing through the MOS transistor M3 to flow. The subtraction circuit 44 receives the voltages of the external terminals SENSP and SENSN through the input resistors R1 and R2, thus outputting the voltage in accordance with the potential difference ΔV of the terminals SENSP and SENSN. The voltage-current conversion circuit 45 converts the voltage into a current, thus drawing the current in accordance with ΔV.

In the voltage correction circuit 41 in this embodiment, the variable resistor circuit VR for adjusting the voltage correction amount is connected between the source terminal of the MOS transistor M3 and the ground point. The voltage correction circuit 41 includes a resistance adjustment circuit 47 that generates a signal for adjusting the resistance value ROVA of the variable resistor circuit VR in accordance with the voltages of the external terminals SENSP and SENSN. The variable resistor circuit VR includes, for example, a plurality of ladder resistors, and switch elements connected in parallel or in series to the respective resistors, and is configured to change the resistance value by selectively bringing the switch elements into the on state in accordance with the signal from the resistance adjustment circuit 47.

The resistance adjustment circuit 47 includes a register that stores information on the signal for adjusting the resistance value ROVA obtained by temporarily causing the current Ibias to flow through the resistor Rs for current detection when the enable signal EN rises. Note that it may be configured so that the signal for adjusting the resistance value ROVA of the variable resistor circuit VR is supplied from the outside of the IC (e.g., a load unit). In the case of supplying the adjustment signal (information) for the variable resistor circuit VR from the outside of the IC, an external terminal for inputting the adjustment signal into the power supply IC 10 is required to be prepared. Both the resistance adjustment circuit 47 and the external terminals for receiving the adjustment signal may be provided. In this case, it may be configured so that the adjustment signal from the outside is prioritized, or any one is selectable.

The combiner 42 includes: a voltage-current conversion circuit 48 that includes a buffer amplifier AMP3 having a non-inverting input terminal into which the reference voltage VREF serving as a reference is input, and a MOS transistor M6 having a gate terminal to which the output of the amplifier AMP3 is applied; and a current mirror circuit (M7 and M8) 49 that causes a current proportional to the current flowing through the MOS transistor M6 to flow. The drain terminal of the MOS transistor M6 is connected to the ground point via a resistor R5.

The drain current of the MOS transistor M8 on the output side included in the current mirror circuit 49, and the drain current of the MOS transistor M5 on the output side included in the current mirror circuit 46 of the voltage correction circuit 41 described above are joined at a node N1, and caused to flow to the resistor R5, thus generating and outputting a composite voltage obtained by adding the correction voltage VOVA to the reference voltage VREF serving as the reference. It is configured so that the voltage is input as a reference voltage VREF' into the non-inverting input terminal of the error amplifier 13 in FIG. 1.

Figure 4A:
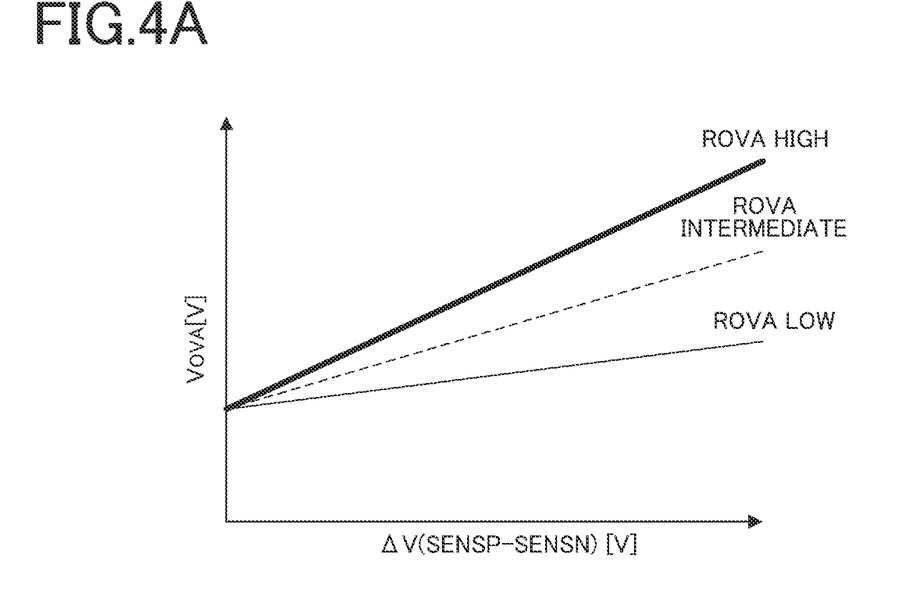
FIG. 4A is a graph showing the relationship between the input voltages of external terminals SENSP and SENSN and the output voltage of a voltage correction circuit in the power supply IC in the embodiment.

FIG. 4(A) shows the relationship between the potential difference ΔV between the external terminals SENSP and SENSN, and the correction voltage VOVA. As shown in FIG. 4(A), in the circuit in this embodiment, it is configured so that the correction voltage VOVA is proportional to the potential difference ΔV between the external terminals SENSP and SENSN, and the higher the resistance value ROVA of the variable resistor VR is, the larger the slope is.

Figure 4B:
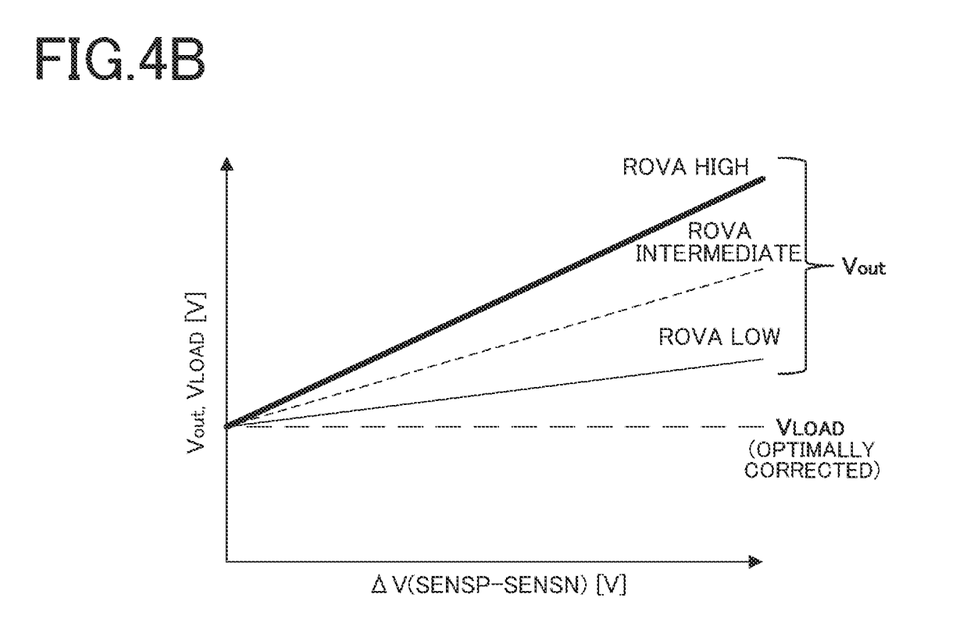
FIG. 4B is a graph showing the relationship between the input voltages of the external terminals SENSP and SENSN and the output voltage of the DC-DC converter.

In the DC-DC converter in the embodiment shown in FIG. 1, when the current flowing through the resistor Rs for current detection increases and the potential difference ΔV between the external terminals SENSP and SENSN increases, the reference voltage VREF' input into the error amplifier 13 becomes high, and the logic circuit 11 changes the on time of the switching transistors M1 and M2. As a result, as shown in FIG. 4(B), it is controlled so that the larger the potential difference ΔV between the external terminals SENSP and SENSN is, the higher the output voltage Vout of the DC-DC converter is set, thus making a voltage VLOAD supplied to the voltage input terminal CN1 of the load unit 22 substantially constant.

As for the on/off control scheme of the switching transistors M1 and M2 in the logic circuit (switching control circuit) 11 in the power supply IC in this embodiment, for example, as described in JP 2012-139023A, various control schemes have conventionally been proposed. In the DC-DC converter in this embodiment, the logic circuit 11 can be configured by adopting a publicly known control scheme. Accordingly, description of a specific example is omitted.

Note that the logic circuit 11 in the power supply IC in this embodiment includes not only the on/off control of the switching transistors M1 and M2 but also the logic of generating the control signal for temporarily causing the current Ibias to flow through the resistor Rs for current detection when the enable signal EN rises as described above, while a timer for starting the original switching control after the resistance value of the variable resistor VR is adjusted is provided. Instead of the timer provided, a logic for starting the switching control upon receipt of an adjustment finish signal from the resistance adjustment circuit 47 may be provided.

As described above, in this embodiment, the current Ibias is temporarily caused to flow through the resistor Rs for current detection when the enable signal EN rises, and the resistance value information on the load side is obtained accordingly. According to the above, the DC-DC converter automatically determines the correction amount for the reference voltage and an adjustment is made. Consequently, a consideration process of adjusting peripheral components on the DC-DC converter side conventionally required in designing can be omitted. When the system is constructed, the power supply cable 21 to be used has variation in resistance value. The DC-DC converter in this embodiment has an advantage of negating the need of consideration of variation in components because correction also supporting the variation in the resistance value of the power supply cable 21 is performed. Furthermore, the power supply IC in this embodiment internally includes the resistor for adjusting the voltage correction amount. Accordingly, the number of components can be reduced in comparison with that of the DC-DC converter including the conventional power supply IC shown in FIG. 7 including, as an external element, the resistor for adjusting the voltage correction amount.

(Modification)

Next, a modification of the DC-DC converter (power supply IC) in the aforementioned embodiment is described with reference to FIGS. 5 and 6.

Figure 5:
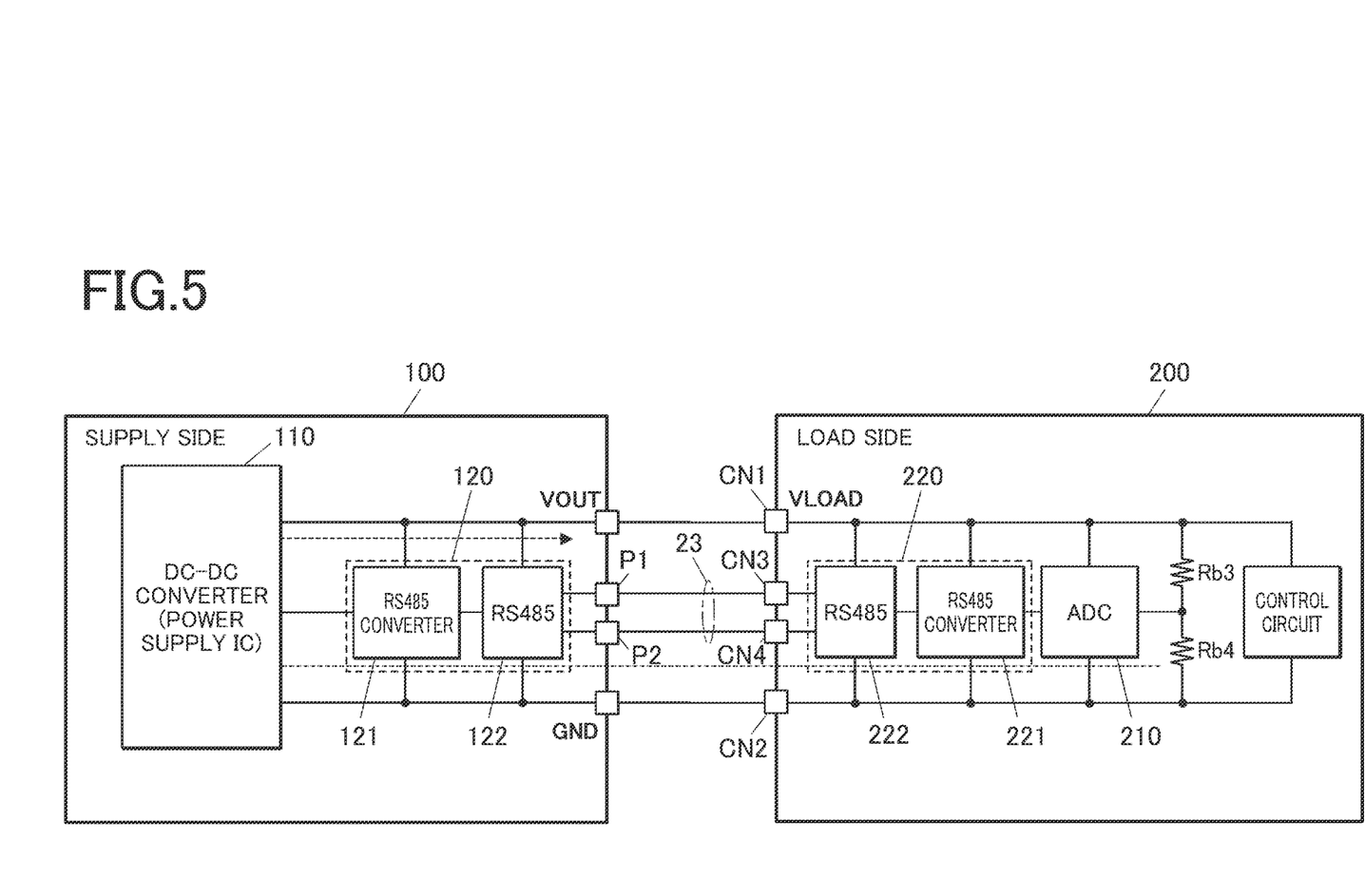
FIG. 5 is a configuration diagram showing a modification of a system to which the present invention is applied.

As shown in FIG. 5, this modification is configured so that a power supply device 100 including a DC-DC converter 110, and a load device 200 are respectively provided with communicators 120 and 220 capable of executing serial communication in conformity with a communication standard, such as RS485, and information about the resistance on the load side is transmitted (fed back) to the power supply device 100 from the load device 200.

Similar to the power supply IC 10 shown in FIG. 1, the power supply IC constituting the power supply device 100 includes the constant current supply 15, the switch element SW1 and the voltage correction circuit 41, and is configured to correct the reference voltage to be supplied to the error amplifier 13 in the voltage correction circuit 41.

Meanwhile, the load device 200 includes: an AD converter (ADC) 210 that converts, into digital values, information about the resistance on the load side (analog value) obtained by dividing the voltage of the voltage input terminal CN1 by the in-series resistors Rb3 and Rb4, for example; and a communicator 220 that outputs the converted values through the terminals CN3 and CN4.

Furthermore, in this modification, the resistor Rs for current detection is not required to be provided for the power supply device 100. The power supply IC of the DC-DC converter 110 is provided with a pair of terminals P1 and P2 for receiving information (serial data) from the load device 200 side through the communication cables 23, instead of the external terminals SENSP and SENSN shown in FIG. 3. The voltage correction circuit 41 is configured as a circuit obtained by removing, from the circuit shown in FIG. 3, the subtraction circuit 44 and the voltage-current conversion circuit 45 including the buffer amplifier AMP2 and the MOS transistor M3. The resistance adjustment circuit 47 is configured to adjust the resistance value ROVA of the variable resistor circuit VR by data supplied from the load device 200 side.

The communicator 220 of the load device 200 includes a converter 221 that performs parallel/serial conversion, and a serial port (driver) 222. The communicator 120 of the power supply device 100 includes a converter 121 that performs serial/parallel conversion, and a serial port (receiver) 122. Note that each of the communicators 120 and 220 may be configured to perform bidirectional communication.

Figure 6A:
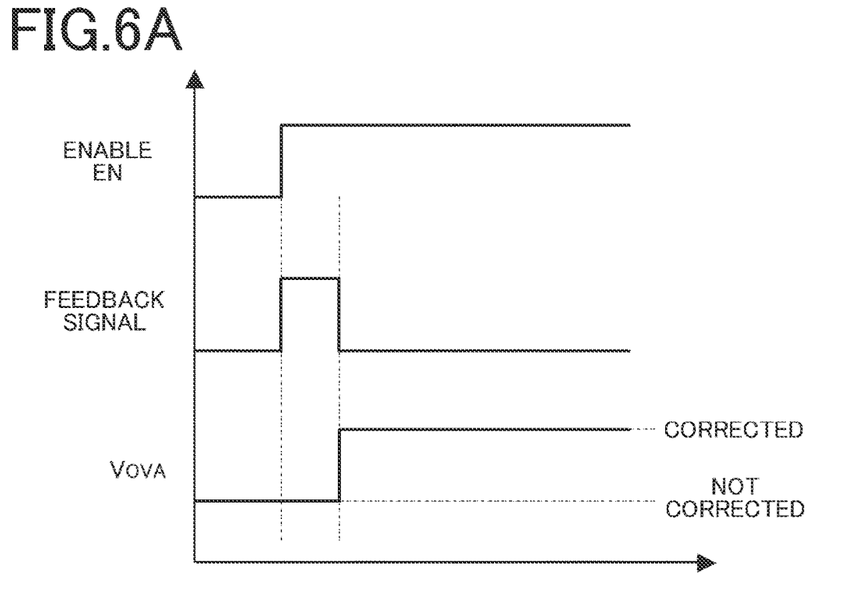
FIG. 6A is a timing chart showing a first operation timing example of the power supply IC in the system in FIG. 5.
Figure 6B:
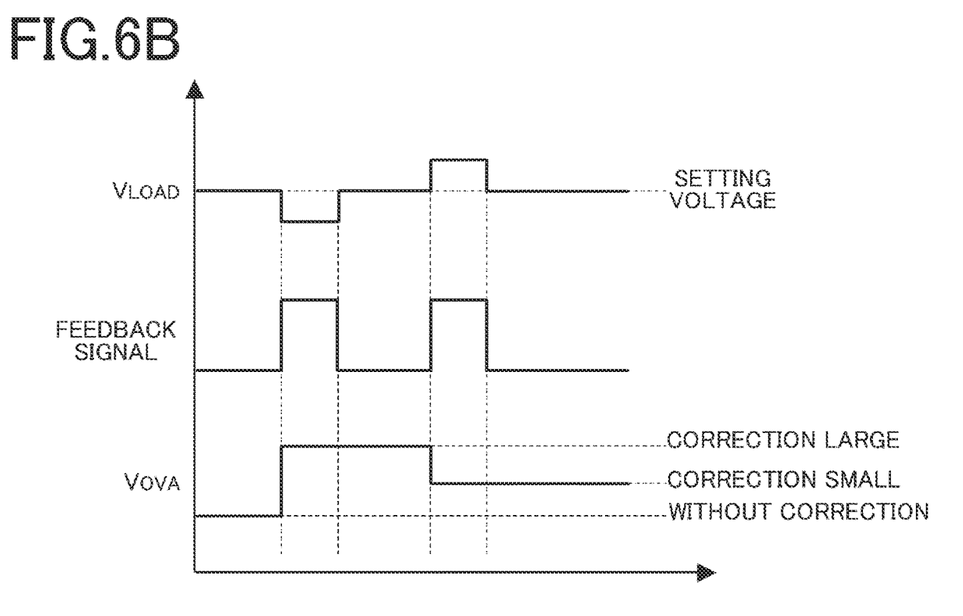
FIG. 6B is a timing chart showing a second operation timing example of the power supply IC in the system in FIG. 5.

FIGS. 6(A) and 6(B) show timing examples of a voltage correction operation in this modification.

FIG. 6(A) between FIGS. 6(A) and 6(B) shows a case of configuration where, similar to the embodiment described above, the switch element SW1 is turned on when the enable signal EN rises, a flow from the constant current supply 15 is caused to flow to the power supply cable, information (including the resistance component of the cable) about the resistance detected on the load side at the time is transmitted to the power supply device 100, and the power supply IC corrects the voltage using the received information (feedback signal). In the case of such a configuration, the correction voltage VOVA generated by the voltage correction circuit 41 is corrected and changed once when the enable signal EN rises.

On the other hand, FIG. 6(B) shows the case of a configuration where information (feedback signal) about the resistance on the load side is periodically transmitted from the load device 200 to the power supply device 100 while the system is in operation, and the voltage is corrected using the information received by the power supply IC. In the case of such a configuration, the correction voltage VOVA generated by the voltage correction circuit 41 changes in accordance with the change in the voltage VLOAD of the voltage input terminal CN1 of the load device 200.

The timing when the information about the resistance on the load side is transmitted from the load device 200 to the power supply device 100 may be a timing when the power supply IC of the power supply device 100 periodically turns on the internal switch element SW1 and causes the current from the constant current supply 15 to flow to the power supply cable, or another timing. In the case of the other timing, the constant current supply 15 and the switch element SW1 are not required for the power supply IC. Note that the power supply IC of the power supply device 100 may be configured to be capable of selecting the timing shown in FIG. 6(A) or the timing shown in FIG. 6(B) at which the voltage correction is to be executed.

The invention made by the present inventors are specifically described based on the embodiment. However, the present invention is not limited to the above embodiments. For example, in the embodiment described above, the reference voltage is corrected by the voltage correction circuit. The feedback voltage may be corrected instead.

In the embodiment described above, a configuration in which the MOS transistor is adopted as a transistor included in the power supply IC 10 is described. However, a bipolar transistor may be adopted instead of the MOS transistor. Furthermore, in the embodiment described above, a configuration in which the present invention is applied to the synchronous rectification scheme DC-DC converter is described. However, the present invention is also applicable to a non-synchronous rectification DC-DC converter that adopts a diode instead of the switching transistor M2 in FIG. 1.

In the embodiment described above, the system of supplying the DC power supply to the unit serving as a load from the power supply device is described as an application example. The present invention is applicable also to a case where, for example, in a system including a servo drive and an encoder, a function of supplying a power supply to the encoder is provided on the servo drive side, the information about the resistance on the load side is fed back to the servo drive from the encoder, and the power supply is controlled (corrected).

INDUSTRIAL APPLICABILITY

In the embodiment described above, the case of applying the present invention to the switching control scheme DC-DC converter is described. The present invention is applicable also to a linear regulator that continuously controls a transistor provided between a voltage input terminal and an output terminal in accordance with the feedback voltage from the output side, and maintains the output voltage constant.

In the aforementioned embodiment, the application of the present invention to the buck DC-DC converter is described. The present invention is applicable also to a boost or buck-boost DC-DC converter. Furthermore, the present invention can be adopted irrespective of the control scheme, such as voltage mode control, current mode control, or hysteresis control.

REFERENCE SIGNS LIST 10 semiconductor integrated circuit for power supply (power supply IC)
11 logic circuit (control circuit)
12A, 12B driver circuit
13 error amplifier
14 reference voltage supply circuit
15 constant current supply
21 power supply cable
22 load unit
41 voltage correction circuit
42 combiner 44 subtraction circuit
45, 48 voltage-current conversion circuit
46, 49 current mirror circuit
47 resistance adjustment circuit
VR variable resistor circuit
L1 inductor (coil)
M1 switching transistor for driving inductor (switching element)

What is claimed is:

1. A DC-DC converter that converts a DC input voltage supplied from a DC power supply and that outputs a DC voltage with a different potential, the DC-DC converter comprising:
 a control circuit that controls a switching element in accordance with a potential difference between a feedback voltage proportional to an output voltage and a predetermined reference voltage;
 a current supply circuit that causes a predetermined current to flow; and
 a voltage correction circuit that corrects the reference voltage or the feedback voltage,
 wherein the voltage correction circuit is configured to determine a voltage correction amount, based on information about a resistance on a load side input from outside when a current of the current supply circuit is output, and correct the reference voltage or the feedback voltage.

2. The DC-DC converter according to claim 1, further comprising a path switch that outputs the current of the current supply circuit toward a voltage output terminal in accordance with a signal supplied from the outside to control execution/stop of a circuit operation changing to a significant level.

3. The DC-DC converter according to claim 1, wherein a current-voltage conversion element is connected between a voltage input terminal and a voltage output terminal in series with the switching element, and the current of the current supply circuit is output toward the voltage output terminal through the current-voltage conversion element, and the voltage correction circuit is configured to determine the voltage correction amount, based on a voltage converted by the current-voltage conversion element, and correct the reference voltage or the feedback voltage.

4. The DC-DC converter according to claim 3, wherein the voltage correction circuit includes: a subtraction circuit that calculates a potential difference between both terminals of the current-voltage conversion element; a first voltage-current conversion circuit that converts the potential difference calculated by the subtraction circuit into a current; a variable resistor circuit connected to the first voltage-current conversion circuit; a second voltage-current conversion circuit that converts the reference voltage into a current; and a combining circuit that combines the current converted by the first voltage-current conversion circuit, with the current converted by the second voltage-current conversion circuit, and converts a combined current into a voltage and outputs the voltage of the converted combined current as a corrected voltage, wherein the variable resistor circuit is configured so that a resistance value of the variable resistor circuit is higher when the potential difference between both terminals of the current-voltage conversion element is larger in accordance with the voltage converted by the current-voltage conversion element.

5. The DC-DC converter according to claim 1, wherein the control circuit includes: an error amplifier circuit that outputs a voltage in accordance with a potential difference between a voltage divided by a voltage divider circuit connected between a voltage output terminal and a ground point, and the reference voltage; and a logic circuit that generates an on/off control signal of the switching element in accordance with the voltage output by the error amplifier circuit.

6. A semiconductor integrated circuit that controls a power supply constituting a DC-DC converter that converts a DC input voltage supplied from a DC power supply and outputs a DC output voltage with a different potential, by turning on and off a switching element connected between a voltage input terminal and an external terminal to which one terminal of an inductor is connected, and rectifying a current flowing through the inductor, the semiconductor integrated circuit comprising: a control circuit that controls the switching element in accordance with a potential difference between a feedback voltage proportional to the DC output voltage and a predetermined reference voltage; a current supply circuit that causes a predetermined current to flow; a path switch that outputs the current of the current supply circuit toward a voltage output terminal; a voltage correction circuit that corrects the reference voltage or the feedback voltage; and an external information input terminal through which an information signal from outside is input, wherein the voltage correction circuit is configured to determine a voltage correction amount, based on the information signal input through the external information input terminal from a load side when the current of the current supply circuit is output, and correct the reference voltage or the feedback voltage.

7. The semiconductor integrated circuit that controls the power supply according to claim 6, further comprising: an input terminal of a signal to control execution/stop of a circuit operation supplied from the outside; and a pair of external information input terminals through which voltages of both terminals of a current-voltage conversion element connected to another terminal of the inductor in series with the inductor are input, wherein the path switch outputs the current of the current supply circuit to a terminal connected to a connection point between the inductor and the current-voltage conversion element between the pair of the external information input terminals, in accordance with the signal changing to a significant level, and wherein the voltage correction circuit is configured to determine a voltage correction amount, based on a difference of voltages input through the pair of the external information input terminals when the current of the current supply circuit is output, and correct the reference voltage or the feedback voltage.

8. The semiconductor integrated circuit that controls the power supply according to claim 7, wherein the voltage correction circuit includes, a subtraction circuit that calculates a potential difference between both terminals of the current-voltage conversion element; a first voltage-current conversion circuit that converts the potential difference calculated by the subtraction circuit into a current; a variable resistor circuit connected to the first voltage-current conversion circuit; a second voltage-current conversion circuit that converts the reference voltage into a current; and a combining circuit that combines the current converted by the first voltage-current conversion circuit, with the current converted by the second voltage-current conversion circuit, and converts a combined current into a voltage and outputs the voltage of the converted combined current as a corrected voltage, wherein the variable resistor circuit is configured so that a resistance value of the variable resistor circuit is higher when the potential difference between both terminals of the current-voltage conversion element is larger in accordance with the voltage converted by the current-voltage conversion element.

9. The semiconductor integrated circuit that controls the power supply according to claim 6, wherein the control circuit includes, an error amplifier circuit that outputs a voltage in accordance with a potential difference between a voltage divided by a voltage divider circuit connected between the voltage output terminal and a ground point, and the reference voltage; and a logic circuit that generates an on/off control signal of the switching element in accordance with the voltage output by the error amplifier circuit.

10. A power supply device converting a DC input voltage supplied from a DC power supply and outputting a DC voltage with a different potential, the power supply device comprising:
 a control circuit that controls a switching element or a transistor for voltage control connected between a voltage input terminal and a voltage output terminal, in accordance with a potential difference between a feedback voltage proportional to an output voltage and a predetermined reference voltage;
 a current supply circuit that causes a predetermined current to flow; and
 a voltage correction circuit that corrects the reference voltage or the feedback voltage,
 wherein the voltage correction circuit is configured to determine a voltage correction amount, based on information about a resistance on a load side input from outside when a current of the current supply circuit is output, and correct the reference voltage or the feedback voltage.

11. The power supply device according to claim 10, further comprising a path switch that outputs a current of the current supply circuit toward the voltage output terminal in accordance with a signal supplied from the outside that controls execution/stop of a circuit operation changing to a significant level.

12. The power supply device according to claim 10, wherein a current-voltage conversion element is connected between the voltage input terminal and the voltage output terminal in series with the switching element or the transistor for voltage control, and
 the current of the current supply circuit is output toward the voltage output terminal through the current-voltage conversion element, and the voltage correction circuit is configured to determine a voltage correction amount, based on a voltage converted by the current-voltage conversion element, and correct the reference voltage or the feedback voltage.

13. The power supply device according to claim 12, wherein the voltage correction circuit includes, a subtraction circuit that calculates a potential difference between both terminals of the current-voltage conversion element; a first voltage-current conversion circuit that converts the potential difference calculated by the subtraction circuit into a current; a variable resistor circuit connected to the first voltage-current conversion circuit; a second voltage-current conversion circuit that converts the reference voltage into a current; and a combining circuit that combines the current converted by the first voltage-current conversion circuit, with the current converted by the second voltage-current conversion circuit, and converts a combined current into a voltage and outputs the voltage of the converted combined current as a corrected voltage, wherein the variable resistor circuit is configured so that a resistance value of the variable resistor circuit is higher when the potential difference between both terminals of the current-voltage conversion element is larger in accordance with the voltage converted by the current-voltage conversion element.

14. The power supply device according to claim 10, wherein the control circuit includes: an error amplifier circuit that outputs a voltage in accordance with a potential difference between a voltage divided by a voltage divider circuit connected between the voltage output terminal and a ground point, and the reference voltage; and a logic circuit that generates an on/off control signal of the switching element or the transistor for voltage control in accordance with the voltage output by the error amplifier circuit.

* * * * *